Figure 1:
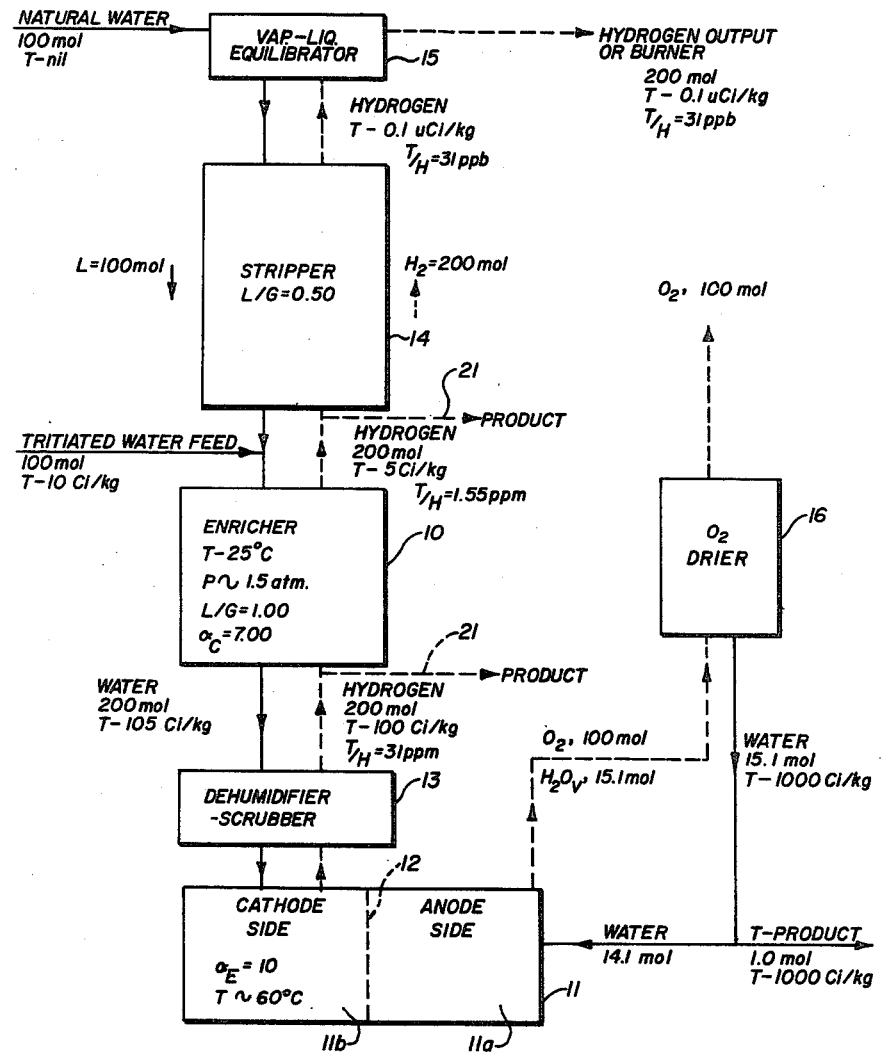

United States Patent [19]

Butler et al.

[11] 4,190,515

[45] Feb. 26, 1980

[54] APPARATUS FOR REMOVAL AND RECOVERY OF TRITIUM FROM LIGHT AND HEAVY WATER

[75] Inventors: John P. Butler; Martin Hammerli, both of Deep River, Canada

[73] Assignee: Atomic Energy of Canada Limited, Ottawa, Canada

[21] Appl. No.: 907,105

[22] Filed: May 18, 1978

[51] Int. Cl.$^2$ .......................... C25B 1/10; C25B 1/00; C01B 4/00; C01G 57/00
[52] U.S. Cl. .................................. 204/266; 204/129; 423/648 A; 423/249; 204/128
[58] Field of Search ............... 423/648 A, 580 H, 249; 204/129, 128, 101, 266, 237

[56] References Cited

U.S. PATENT DOCUMENTS

| | | | |
|---|---|---|---|
| 3,505,017 | 4/1970 | Roth | 423/249 X |
| 3,957,597 | 5/1976 | Maroni | 423/249 X |
| 3,974,048 | 8/1976 | Hammerli et al. | 204/129 X |

FOREIGN PATENT DOCUMENTS

| | | | |
|---|---|---|---|
| 2727306 | 12/1977 | Fed. Rep. of Germany | 423/648 A |
| 1593961 | 7/1970 | France | 423/580 H |

Primary Examiner—John H. Mack
Assistant Examiner—D. R. Valentine
Attorney, Agent, or Firm—James R. Hughes

[57] ABSTRACT

A method and apparatus for removing tritium from heavy water and light water comprising contacting tritiated feed water in a catalyst column in countercurrent flow with hydrogen gas originating from an electrolysis cell so as to enrich this feed water with tritium from the electrolytic hydrogen gas and passing the tritium enriched water to an electrolysis cell wherein the electrolytic hydrogen gas is generated and then fed upwards through the catalyst column. The tritium content of the hydrogen gas leaving the top of the enricher catalyst column is further reduced in a stripper column containing catalyst which transfers the tritium to a countercurrent flow of liquid water.

5 Claims, 2 Drawing Figures

APPARATUS FOR REMOVAL AND RECOVERY OF TRITIUM FROM LIGHT AND HEAVY WATER

This invention relates to a method and apparatus for removing tritium from heavy water, D$_2$O and light water H$_2$O and more particularly to a combined electrolysis-catalytic exchange process and apparatus.

Sources of tritium are for example, as follows: in nuclear fuel reprocessing plants (tritium in light water); in waste streams from military operations connected with nuclear weapons programs; and in heavy water nuclear power reactors both moderator and coolant resulting from neutron capture in deuterium.

At the present time the removal of tritium from water is accomplished by various hydrogen separation techniques, e.g. water distillation, cryogenic distillation of hydrogen, etc. The processes have small separation factors and are not very suitable for the primary preconcentration stage or stages. However, cryogenic distillation of hydrogen is probably the most suitable process for the final enrichment of tritium to 99% tritium (T$_2$).

In nuclear power reactors of the type using heavy water as coolant and moderator, the progressive build-up of tritiated heavy water (DTO) in the D$_2$O can lead to problems in controlling radiation exposure at the nuclear power stations. This DTO impurity is produced continuously in the reactor as the D$_2$O is subjected to neutron irradiation. In present Canadian nuclear generating stations, the average tritium level are the order of 1 curie per kg. of D$_2$O in the primary heat transport systems and over 10 curies per kg of D$_2$O in the moderator systems and these levels are rising. Thus the tritium while present in comparatively minute quantities, because of its radioactivity nonetheless poses significant radiation problems wherever D$_2$O leaks occur or where it is purged from the system.

Although tritium is an undesireable contaminant in heavy water reactors, and other processes, it is forseen that this material will have in the future high commercial value e.g. in laser-induced fusion reactions, in devices requiring small sources of radioactive energy etc.

It is an object of the present invention to provide a safe and economic method and apparatus for removing tritium from heavy and light water.

It is another object of the invention to provide a system for reducing tritium levels in light water systems such that the water can be safely discharged to the environment.

It is another object of the invention to provide apparatus for reducing the tritium levels in the heavy water moderator/coolant systems in nuclear power reactors.

These and other objects of the invention are achieved by a method comprising contacting tritiated feed water in a catalyst column in countercurrent flow with hydrogen gas originating from an electrolysis cell so as to enrich this feed water with tritium from the electrolytic hydrogen gas and passing the tritium enriched water to an electrolysis cell wherein the electrolytic hydrogen gas is generated and then fed upwards through the catalyst column. The tritium content of the hydrogen gas leaving the top of the enricher catalyst column is further reduced in a stripper column containing catalyst which transfers the tritium to a countercurrent flow of liquid water.

These objects of the invention are also achieved by apparatus for removal of tritium from light and heavy water comprising a catalyst isotope exchange column with hydrogen gas and liquid water passing therethrough in countercurrent isotope exchange relationship, an electrolysis cell having an anode side and a cathode side and a separator therebetween, a dehumidifier-scubber, means for passing the liquid water enriched in tritium from the catalyst column through the dehumidifier-scrubber to the electrolysis cell, means for passing the hydrogen gas evolved in the cathode side of the cell through the dehumidifier-scrubber to the catalyst column, said dehumidifier-scrubber adapted to adjust the humidity of said hydrogen gas from the conditions pertaining in the electrolysis cell to those pertaining in the catalyst column and equilibrates the tritium in water vapor carried by the hydrogen gas with the down-flowing liquid water stream, a stripper containing the same catalyst as the exchange column, means for passing the hydrogen gas from the catalyst column through the stripper to an output, means for passing a liquid water feed through the stripper to the catalyst tower, said stripper adapted to strip the tritium out of the hydrogen gas and transfer it to the down flowing liquid water stream, means for introducing the tritiated water feed along with liquid from the stripper to the upper portion of the catalyst column, and means for taking an output enriched in tritium from the system. The preferred arrangement further comprises a gas drier, means for taking the oxygen gas evolved in the anode side of the electrolysis cell and highly tritiated water vapor from the cell and passing it through the gas drier to condense the water, means for returning a portion of this water to the cell and means for taking the remaining portion as a tritium product output.

Figure 2:
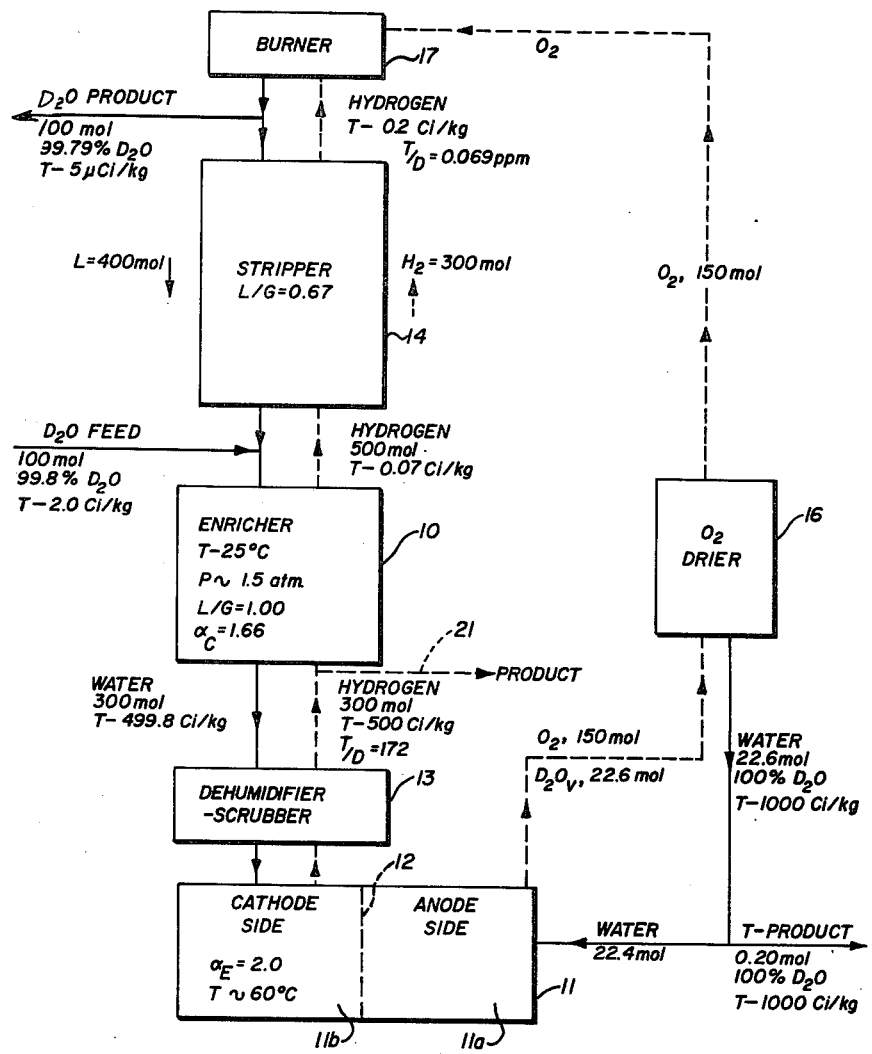

In drawings which illustrate embodiments of the invention,

FIG. 1 is a flow diagram of the process for tritium recovery from light water, and FIG. 2 is a flow diagram of the process for tritium recovery from heavy water.

The drawings indicate examples of the important parameters of the processes as follows:

(a) liquid and gas flow rates in moles
(b) tritium (T) concentrations as curies per kilogram (Ci/kg) of water
(c) liquid/gas molar flow rates (L/G) as a ratio
(d) temperature (T) in °C
(e) pressure (P) in atmospheres
(f) catalyst separation factor ($\alpha_c$) as a ratio
(g) electrolytic separation factor ($\alpha_E$) as a ratio.

It should be pointed out that the specific concentrations and molar flows given in the figures are by way of example only and can be varied according to design considerations.

Referring to FIG. 1, the chief elements of the apparatus are an enricher 10 and an electrolyser 11. The enricher is an exchange column containing a packed catalyst bed in which hydrogen gas and liquid water pass in countercurrent isotope exchange relationship. The high separation factor between tritium and protium, $\alpha_C \sim 7$ at 25° C., makes this process very effective for concentrating tritium. The catalyst must be wet-proofed, hydrophobic and of course active in the presence of liquid water. The preferred catalyst material is a Group VIII metal having a liquid-water-repellent organic polymer or resin coating thereon selected from the group consisting of polyflurocarbons, hydrophobic hydrocarbon polymers of medium to high molecular weight, and silicones, and which is permeable to water vapor and hydrogen gas. This type of catalyst is described in U.S.

Pat. No. 3,981,976 issued Sept. 21, 1976 and in Co-Pending U.S. application No. 733,417 filed Oct. 18, 1976, now U.S. Pat. No. 4,126,667. Preferable types of catalysts are also described in a paper entitled "Novel Catalysts for Isotopic Exchange between Hydrogen and Liquid Water" published in the ACS Symposium Series No. 68, of the American Chemical Society, (1978).

The electrolyser 11 is any type of electrolysis cell incorporating a separator 12 between the anode compartment 11a and the cathode compartment 11b. For economic reasons, it is preferable that the cell used has a low water and/or electrolyte inventory.

The electrolytic hydrogen produced in the electrolytic cell is already depleted in tritium relative to the electrolyte by virtue of the kinetic isotope effect inherent in the hydrogen evolution reaction, passes upward (dotted lines) through a dehumidifier-scrubber 13 and through the catalyst column 10 where it steadily loses most of its remaining tritium as it moves up the column in countercurrent flow with the tritiated water feed (solid lines) introduced above the column and trickling down through the column, through the dehumidifier-scrubber to the electrolysis cell. The dehumidifier-scrubber serves to adjust the humidity of the depleted hydrogen gas to the conditions prevailing in the enricher, to bring the tritium concentration of the water vapor in the gas stream in isotopic equilibrium with the liquid water from the enricher, and to transfer any entrained electrolyte in the hydrogen gas to the downflowing water stream. The hydrogen gas after passing through the enricher passes to stripper 14, which also contains the hydrophobic catalyst so that the tritium content of the already depleted hydrogen is further reduced by transferring the tritium to the countercurrent stream of liquid water. The hydrogen gas then flows to the vapor-liquid equilibrator 15 which serves to bring the tritium concentration of the water vapor in the gas stream is isotopic equilibrium with a natural liquid water input (e.g. 100 mol., having a tritium concentration $T \approx 0$). This liquid is then returned to the stripper. If the tritium concentration of the output hydrogen gas is reduced to sufficiently low values it could be released directly to the atmosphere. The hydrogen could be burned as a source of energy and the resulting water could be used as process water in the system. Part of this water could thus be used as feed water to the stripper column.

The liquid to gas molar ratio, L/G, in stripper column 14 can be varied in the practical range of 0.2 to 0.8. At lower values of this ratio, the catalyst volume increases and it is difficult to operate the column. At an L/G ratio=0.5 (as shown in FIG. 1,) the number of times the tritiated water feed must be electrolysed is 2. As the L/G increases, the number of times this feed must be electrolysed increases rapidly e.g. at L/G=0.8, it becomes 5. In the system shown in the figure, a natural water feed is used for stripping and its low tritium content makes the stripping operation easy. As mentioned above it is also possible to use part of the hydrogen converted to water as this feed. In removing tritium from water from a feed reprocessing plant it may only be necessary to reduce the tritium level by about a factor of 6. In this case, the stripper column may not be necessary. The hydrogen product from the enricher column could be converted to water and returned as process water to the fuel reprocessing plant.

The oxygen gas and water vapor $H_2O_V$, from the anode side of the electrolysis cell 11 is passed to drier 16 that removes the water and the heavily tritiated liquid water is returned to the cell. A fractional output is taken as product. The drier could be for example a condenser involving a packed column, molecular sieve driers, etc. The oxygen output, $O_2$, may be exhausted to the atmosphere or used in the conversion of the hydrogen output to water.

The tritium product from this process may be fed to a small electrolysis cell and the hydrogen produced is dried and deoxygenated before it is fed to a cryogenic hydrogen distillation column for final enrichment. Alternatively, a fraction of the hydrogen stream to the enricher column could be dried deoxygenated and fed to the cryogenic distillation column. The product could also be withdrawn from the liquid electrolyte of the cells or from the water in those cells which incorporate a solid electrolyte.

Referring to FIG. 2 a flow diagram for the process adapted for removal of tritium from heavy water is shown. The tritiated liquid heavy water is fed to the top of the enricher 10. A burner 17 recombines the $O_2$ and hydrogen gas outputs to provide a $D_2O$ product output and reflex liquid water to stripper 14. In this system, the hydrogen water separation factor, $\alpha_c$ in enricher 10 and in the stripper 14 is small, e.g. 1.66 at 25° C. and the L/G ratio of the stripper is governed by the amount of stripping required and the separation factor. Practical L/G values lie in the range of 0.4 to 0.7.

The electrolytic D/T separation factor, $\alpha_E$, also smaller in this case and has values ranging from about 1.3 to 2 depending on electrode material and operating conditions. Because a stripper column is required, the number of times the tritiated heavy water feed must be electrolysed is about 1.7 to 3.5 times and in the example shown, it is electrolysed 3.0 times. Because the separation factors $\alpha_c$ and $\alpha_E$ are much smaller for the tritium-deuterium system compared to the tritium-protium system, tritium recovery from heavy water is more difficult. Thus, in a single stage, the overall enrichment factors are smaller e.g. 100 to 5000 as compared to $10^6$ to $10^8$ for tritium recovery from light water.

In the above descriptions, the output is taken from the water stream returning from the drier to the cell. Alternatively, an output could be taken from the hydrogen gas stream passing from the dehumidifier-scrubber to the enricher as shown by line 21 in both figures.

We claim:
1. Apparatus for removal of tritium from light and heavy water comprising:
    (a) a catalyst isotope exchange column enricher with means for passing hydrogen gas and liquid water therethrough in countercurrent isotope exchange relationship,
    (b) an electrolysis cell having an anode side and a cathode side and a separator therebetween,
    (c) a dehumidifier-scrubber,
    (d) means for passing the liquid water enriched in tritium from the catalyst column through the dehumidifier-scrubber to the electrolysis cell,
    (e) means for passing the hydrogen gas evolved in the cathode side of the cell through the dehumidifier-scrubber to the catalyst column, said dehumidifier-scrubber adapted to adjust the humidity of the tritium depleted hydrogen gas to the conditions prevailing in the enricher, to bring the tritium concentration of the water vapor in the gas stream in isotopic equilibrium with the liquid water from the enricher, and to transfer any entrained electro- lyte in the hydrogen gas to the downflowing water stream,
(f) a stripper,
(g) means for passing the hydrogen gas from the catalyst column through the stripper to an output,
(h) means for passing liquid water feed through the stripper to the catalyst tower, said stripper adapted to reduce the tritium content of the already depleted hydrogen by transferring the tritium to the countercurrent stream of liquid water,
(i) means for introducing the tritiated water feed to the upper portion of the catalyst column,
(j) a gas drier,
(k) means for taking the oxygen gas evolve in the anode side of the electrolysis cell and highly tritiated water vapor from the cell and passing it through the gas drier to remove the water,
(l) means for returning this water to the cell, and
(m) means for taking a tritium product from the system.

2. Apparatus as in claim 1 wherein the means for taking a tritium product is means for taking a portion of the water from the oxygen gas drier and passing to an output.

3. Apparatus as in claim 1 wherein the means for taking a tritium product is means for taking a portion of the hydrogen gas stream between the dehumidifier-scrubber and the enricher and passing to an output.

4. Apparatus for removing tritium from light water as in claim 1 further comprising a vapor-liquid equilibrator, means for introducing a natural liquid water input to the equilibrator, means for passing the hydrogen gas from the stripper to the equilibrator, said equilibrator adapted to bring the tritium concentration of water vapor in the gas stream into isotopic equilibrium with the natural water input, means for passing the liquid water from the equilibrator to the stripper, and means for passing the tritium depleted hydrogen gas from the equilibrator to an output.

5. Apparatus for removing tritium from heavy water as in claim 1 further comprising a burner for recombining oxygen and hydrogen, means for passing the hydrogen gas from the stripper to the burner, means for passing oxygen gas from the said gas drier to the burner, means for passing a portion of the recombined water from the burner to the stripper, and means for returning the remaining portion of the recombined water depleted in tritium to the source.

* * * * *